US008223192B2

(12) United States Patent
Gotsman et al.

(10) Patent No.: US 8,223,192 B2
(45) Date of Patent: Jul. 17, 2012

(54) FREE VIEWPOINT VIDEO

(75) Inventors: Craig Gotsman, Haifa (IL); Alexander Bogomjakov, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 1282 days.

(21) Appl. No.: 11/930,186

(22) Filed: Oct. 31, 2007

(65) Prior Publication Data

US 2009/0109280 A1  Apr. 30, 2009

(51) Int. Cl.
*H04N 7/00* (2011.01)
(52) U.S. Cl. ............................................. 348/39; 348/36
(58) Field of Classification Search .................... 348/36, 348/39, 47, 48
See application file for complete search history.

(56) References Cited

U.S. PATENT DOCUMENTS

| | | | |
|---|---|---|---|
| 4,723,159 A | 2/1988 | Imsand | |
| 6,429,867 B1 | 8/2002 | Deering | |
| 6,573,912 B1 | 6/2003 | Suzuki et al. | |
| 6,701,030 B1 * | 3/2004 | Uyttendaele et al. | 382/284 |
| 6,788,333 B1 * | 9/2004 | Uyttendaele et al. | 348/36 |
| 6,864,903 B2 | 3/2005 | Suzuki | |
| 7,352,359 B2 * | 4/2008 | Zalewski et al. | 345/156 |
| 7,929,800 B2 * | 4/2011 | Meadow et al. | 382/284 |
| 2003/0231179 A1 * | 12/2003 | Suzuki | 345/423 |
| 2005/0088515 A1 * | 4/2005 | Geng | 348/47 |
| 2006/0187305 A1 * | 8/2006 | Trivedi et al. | 348/169 |
| 2006/0221250 A1 | 10/2006 | Rossbach et al. | |
| 2007/0297695 A1 * | 12/2007 | Aratani et al. | 382/284 |
| 2008/0285654 A1 * | 11/2008 | Cai et al. | 375/240.16 |
| 2009/0044113 A1 * | 2/2009 | Jones et al. | 715/707 |

OTHER PUBLICATIONS

Free-View Point Video From Depth Cameras—Compiled by Alexander Bogomjakov, Craig Gotsman and Marcus Magnor—Conference for "Vision Modelling and Visualization 2006" in Aachen, Germany—Nov. 22-24, 2006.

* cited by examiner

*Primary Examiner* — Faruk Hamza

(57) ABSTRACT

A method of remotely viewing a video from a selected viewpoint selected by the viewer from a continuous segment, including, recording a video of a subject using at least one depth video camera that records a video comprising a sequence of picture frames and additionally records a depth value for each pixel of the picture frames, recording a video of the subject using at least one standard video camera positioned to record a video at a viewpoint that differs from the viewpoint of the depth video camera, rendering a depth hull that defines a three dimensional outline of the subject being recorded using the depth values recorded by the depth video cameras, providing the recorded video from one or more cameras positioned on either side of the selected viewpoint, incorporating the recorded video from the one or more cameras onto the rendered depth hull to render a viewable video from the selected viewpoint; and displaying the rendered viewable video to the viewer.

22 Claims, 3 Drawing Sheets

FREE VIEWPOINT VIDEO

FIELD OF THE INVENTION

The present invention relates generally to the production of video, and more specifically the invention relates to the control of the viewpoint of the video by the viewer.

BACKGROUND OF THE INVENTION

Generally, the viewer of a video stream has no control over the perspective used to record the video, whether it is a live transmission or a playback from a recording. The perspective is generally referred to as the viewpoint of the video.

In many cases a viewer may be interested to see the events displayed from a different viewpoint, for example when viewing a soccer game the viewer may wish to see the gameplay from a different angle or to replay a segment of game play from various angles.

A number of methods have been implemented to provide viewers with different views of a video recording; some may be applied during live transmissions and some are applied during video playback. Some of the methods allow the viewer to select the viewpoint and some select the viewpoint for the viewer from a plurality of available views.

A first method provides a setup with multiple cameras, wherein the direction in which each camera is pointed can be controlled by a remote viewer and the viewer can select one of the cameras for viewing. A system such as this may be implemented, for example in a security surveillance system. However such a system can only be controlled by a single viewer and it is limited to the viewpoint of the selected camera.

A second method provides the use of multiple cameras that are positioned at different angles to record a live event. A director decides, which camera will be displayed to the viewers during the event, and a cameraman can change the viewing angle of a specific camera. This type of system is generally implemented in live television broadcasts. However such a system does not provide the viewer with any control over the viewpoint.

A third method provides the use of multiple cameras to record an event, and provides the viewer with all or part of the recorded video streams to select from to view. Such a system is commonly implemented in manufacturing DVD video records, wherein the viewer can select to view specific scenes from multiple viewpoints. However this method generally provides a limited number of viewpoints (e.g. 2-3), only for specific scenes of the entire film, and does not offer continuous transition between the available viewpoints.

A fourth method provides the use of one or more panoramic cameras that can provide images from multiple directions surrounding the panoramic camera, some in the direction of interest and some not. Such a system is commonly incorporated to provide a live view to viewers over the Internet. The viewer can select a camera and the direction of interest for viewing the video. The viewer is then provided with a video stream according to the selected parameters. This method is generally limited to a specific number of viewpoints of a specific subject and does not provide continuous transition between viewpoints around the subject.

A fifth method uses multiple cameras to record an event to a computer. The computer calculates the depth for each pixel of the recordings by comparing the images of the recordings from adjacent cameras. A remote viewer can request to view the event from any perspective. The computer performs complex graphical calculations to create the requested view based on the recordings and depth calculations from each camera on either side of the desired perspective, and transmits the results to the viewer. This method places a heavy calculation burden on the computer and is not adapted for scalability, since the computer is required to perform the complex calculations for each viewer. Alternatively, the computer could transmit all the data to each viewer to prepare its own viewpoint video, however this would require that the viewers all be equipped with strong computers.

U.S. Pat. No. 6,864,903 to Suzuki describes an Internet system for virtual tele-presence based on the fifth method described above, the disclosure of which is incorporated herein by reference. Suzuki also describes using an infrared camera with each regular camera to obtain the depth data required for the video produced by each regular camera without interfering with the recordings of the regular cameras.

SUMMARY OF THE INVENTION

An aspect of the invention relates to a system for recording a video of a subject, which allows the viewer to select a viewpoint from which to view the recording. In an exemplary embodiment of the invention, the viewpoint is limited to a continuous segment around the subject, for example from a semicircle (180 degrees) or from a segment of 90 degrees. Alternatively, the continuous segment may completely encircle the subject (360 degrees), thus allowing the viewer to select any viewpoint around the subject. Optionally, the bounds of the segment depend on the number, position and type of video cameras used.

In an exemplary embodiment of the invention, at least one depth video camera and at least one standard video camera are positioned around the subject to record a video of the subject from different viewpoints. The depth video camera records a video of the subject and the depth value of each pixel from the picture frames of the video recording. The standard video camera records a standard video of the subject. The recordings of the depth video camera and the standard video camera are provided to a central computer that uses the depth information to create a depth hull of the recorded subject. The depth hull is a 3 dimensional geometric outline of the subject being recorded. It should be noted that the subject can be a single figure or multiple figures. By using graphical calculation the central computer can calculate the view of the depth hull from any viewpoint viewing the subject. The recorded video picture frames are used to provide the texture on the depth hull, and optionally, enhance accuracy of the depth hull.

In an exemplary embodiment of the invention, a viewer selects a viewpoint from which to view the video recording. The video recordings of the closest cameras on either side of the viewpoint are selected and incorporated onto the calculated depth hull to render the view from the selected viewpoint. In some embodiments of the invention, not only the closest cameras on either side are used, but instead any camera that can contribute to the texture that will be applied onto the depth hull. In some embodiments of the invention, the central computer performs the calculations and sends the rendered video at the selected viewpoint to the viewer for viewing. Alternatively, the central computer may calculate the depth hull and transmit the depth hull with the appropriate picture frames to the viewer to render the view from the selected viewpoint. Optionally, by transferring the responsibility to the viewer the central computer increases scalability, since it only calculates what is common to all viewers, whereas each viewer calculates the view specific to his/her selection. Additionally, since the depth hull is calculated at the central computer all the recordings from all video cameras do not need to be transmitted to each viewer.

In some embodiments of the invention, the depth information is also transmitted to the viewer, and the viewer constructs a depth hull or a partial depth hull for the viewpoint of interest. Optionally, only relevant recordings that are necessary to construct the viewpoint will be transmitted to the viewer.

In some embodiments of the invention, all the video cameras are synchronized to record pictures simultaneously or sequentially to prevent interference between them. Alternatively, the central computer may instruct each video camera to record.

There is thus provided according to an exemplary embodiment of the invention, a method of remotely viewing a video from a selected viewpoint selected by the viewer from a continuous segment, comprising:

recording a video of a subject using at least one depth video camera that records a video comprising a sequence of picture frames and additionally records a depth value for each pixel of the picture frames;

recording a video of the subject using at least one standard video camera positioned to record a video at a viewpoint that differs from the viewpoint of the depth video camera;

rendering a depth hull that defines a three dimensional outline of the subject being recorded using the depth values recorded by the depth video cameras;

providing the recorded video from one or more cameras positioned on either side of the selected viewpoint;

incorporating the recorded video from the one or more cameras onto the rendered depth hull to render a viewable video from the selected viewpoint; and displaying the rendered viewable video to the viewer.

In an exemplary embodiment of the invention, the continuous segment encompasses 360 degrees around the subject. Optionally, the continuous segment encompasses less than 360 degrees around the subject. In an exemplary embodiment of the invention, the recording is performed using at least 2 depth video cameras. Optionally, the at least 2 depth video cameras are positioned on opposite sides of the subject. In an exemplary embodiment of the invention, the recording is performed using at least 2 depth video cameras and at least 2 standard video cameras surrounding the subject. Optionally, the at least one depth video camera and the at least one standard video camera are operated synchronously. In an exemplary embodiment of the invention, the rendering is performed by a server connected to the video cameras and provided to the remote viewer. Alternatively the rendering is performed by the remote viewer. In an exemplary embodiment of the invention, the providing comprises transmitting the information to the remote viewers. Optionally, the incorporating is performed by the renderer of the depth hull.

There is thus further provided according to an exemplary embodiment of the invention, a system for remotely viewing a video from a selected viewpoint selected by the viewer from a continuous segment, comprising:

at least one depth video camera that records a video of a subject comprising a sequence of picture frames and additionally records a depth value for each pixel of the picture frames;

at least one standard video camera positioned to record a video of the subject at a viewpoint that differs from the viewpoint of the depth video camera;

a computer adapted to receive the recordings of all the video cameras and render a depth hull that defines a three dimensional outline of the subject being recorded using the depth values recorded by the depth video cameras;

one or more remote viewer stations that are adapted to:

1) select a viewpoint for viewing the recorded subject;

2) receive the rendered depth hull;

3) receive the recorded video from the recordings of one or more video cameras positioned on either side of the selected viewpoint of the viewer;

4) incorporate the received recorded video onto the depth hull to render a viewable video from the selected viewpoint; and 5) display the rendered viewable video to the viewer.

In an exemplary embodiment of the invention, the system comprises at least two depth video cameras. Optionally, the two depth video cameras are positioned on opposite sides of the recorded subject. In an exemplary embodiment of the invention, the system comprises at least 2 depth video cameras and at least 2 standard video cameras surrounding the subject. Optionally, the depth video cameras and the standard video cameras are operated synchronously. In an exemplary embodiment of the invention, the computer is adapted to control the order of recording picture frames and depth values by the video cameras. Optionally, the continuous segment encompasses 360 degrees around the subject In an exemplary embodiment of the invention, the continuous segment encompasses less than 360 degrees around the subject.

There is thus further provided according to an exemplary embodiment of the invention, a system for remotely viewing a video from a selected viewpoint selected by the viewer from a continuous segment, comprising:

at least one depth video camera that records a video of a subject comprising a sequence of picture frames and additionally records a depth value for each pixel of the picture frames;

at least one standard video camera positioned to record a video of the subject at a viewpoint that differs from the viewpoint of the depth video camera;

a computer adapted to receive the recordings of all the video cameras;

one or more remote viewer stations that are adapted to:

1) render a depth hull that defines a three dimensional outline of the subject being recorded using the depth values recorded by the depth video cameras;

2) select a viewpoint for viewing the recorded subject;

3) receive the recorded video from the recordings of one or more video cameras positioned on either side of the selected viewpoint of the viewer;

4) incorporate the received recorded video onto the depth hull to render a viewable video from the selected viewpoint; and 5) display the rendered viewable video to the viewer.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
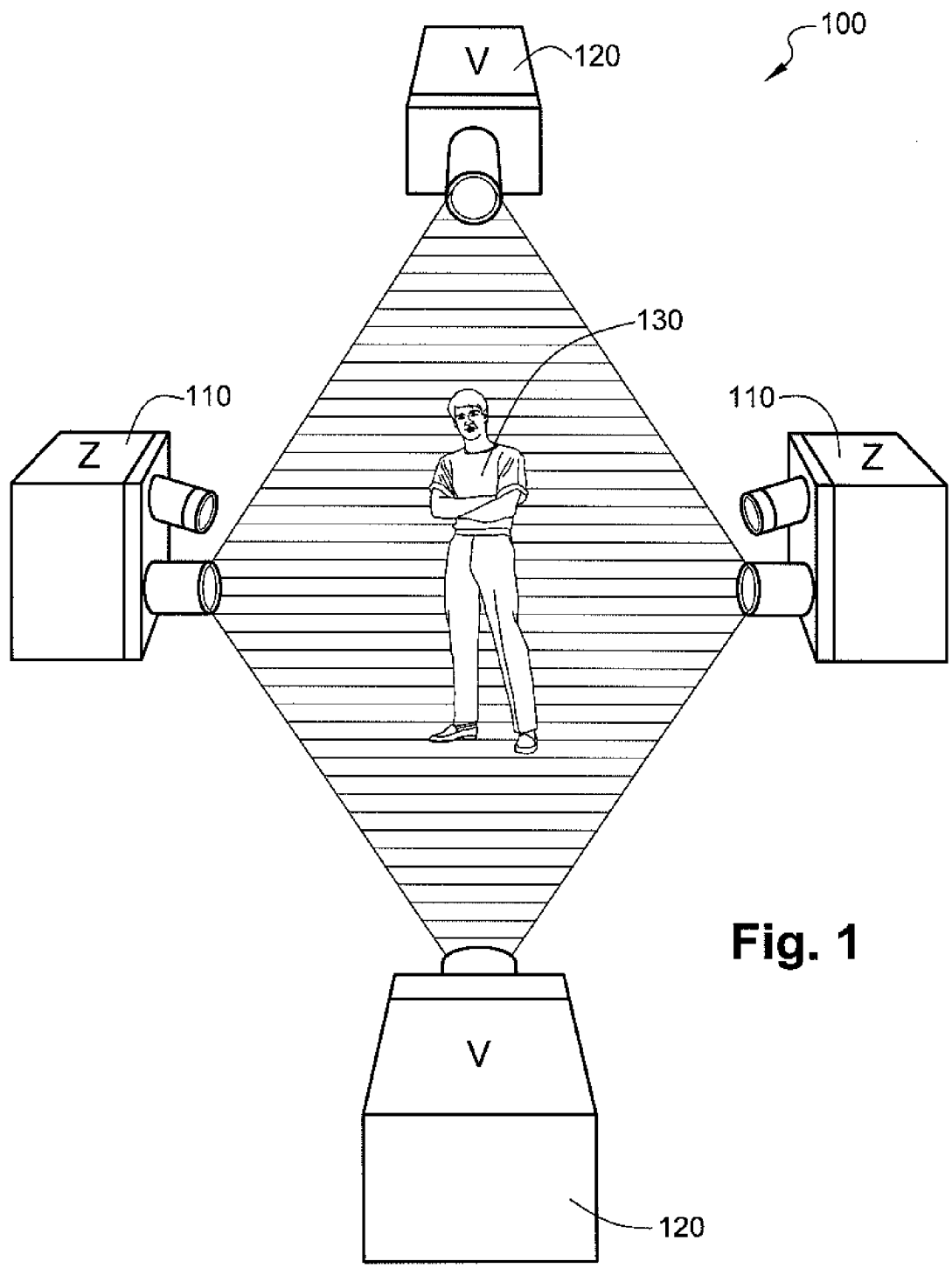
FIG. 1 is a schematic illustration of a system for recording a free viewpoint video, according to an exemplary embodiment of the invention.

FIG. 1 is a schematic illustration of a system for recording a free viewpoint video, according to an exemplary embodiment of the invention. In an exemplary embodiment of the invention, multiple cameras (110, 120) are placed around a subject 130 to record a video that will allow a viewer to change his/her viewpoint of the video while viewing the video recording after it was recorded or even during a live recording. In an exemplary embodiment of the invention, the recording will use two types of cameras for recording the video. One type generally referred to as a V-cam 120 is a standard video camera 120 such as used to record a movie. The second type generally referred to as a Z-cam 110 is a depth camera that provides a video picture recording and the depth of each pixel for each picture frame of the recording.

There are various types of Z-cams 110 available that provide a depth value coupled to a video recording, for example the z-snapper 3D camera sold by Vialux from Germany (www.vialux.de). Some depth cameras shine structured visible light on subject 130 to enable them to record depth (the Z coordinate). The structured light may interfere with the recordings by other cameras when using multiple cameras. In order to overcome this problem the cameras are synchronized so that they do not interfere with each other, for example by having some cameras take pictures simultaneously or one after another if the structured light of one camera interferes with other cameras. In an exemplary situation all the participating cameras will be synchronized to take a picture and then Z-cam 110 will shine a structured light pattern and record the depths for the picture just taken. Optionally, multiple Z-cams 110 will shine the structured light pattern and record a picture sequentially so as not to interfere with each other. Since the video recordings are performed at a relatively high speed (e.g. 20-40 ms for each frame with 10-30 frames per second), it is possible to synchronize between the cameras without deterioration in the quality of the recorded video.

Some depth cameras use structured infrared light to record depth so as not to interfere with the video recordings of standard visible light pictures by the standard video cameras (120) used and/or the standard video picture recording produced by the Z-cam 110 itself. Optionally, the standard visible light pictures may be color pictures or black and white, for example gray scale.

Typically a Z-cam is more complex than a V-cam since it includes a V-cam and a depth recording mechanism. Z-cams are bigger, more expensive, and may introduce synchronization problems between the cameras used to record subject 130 as mentioned above. Thus it is of interest to limit reliance on Z-cams to a minimum. On the other hand the use of Z-cams provide the depth information without using complex calculations in comparing video pictures from two video cameras, which places a heavy burden on the available computational resources.

Figure 2:
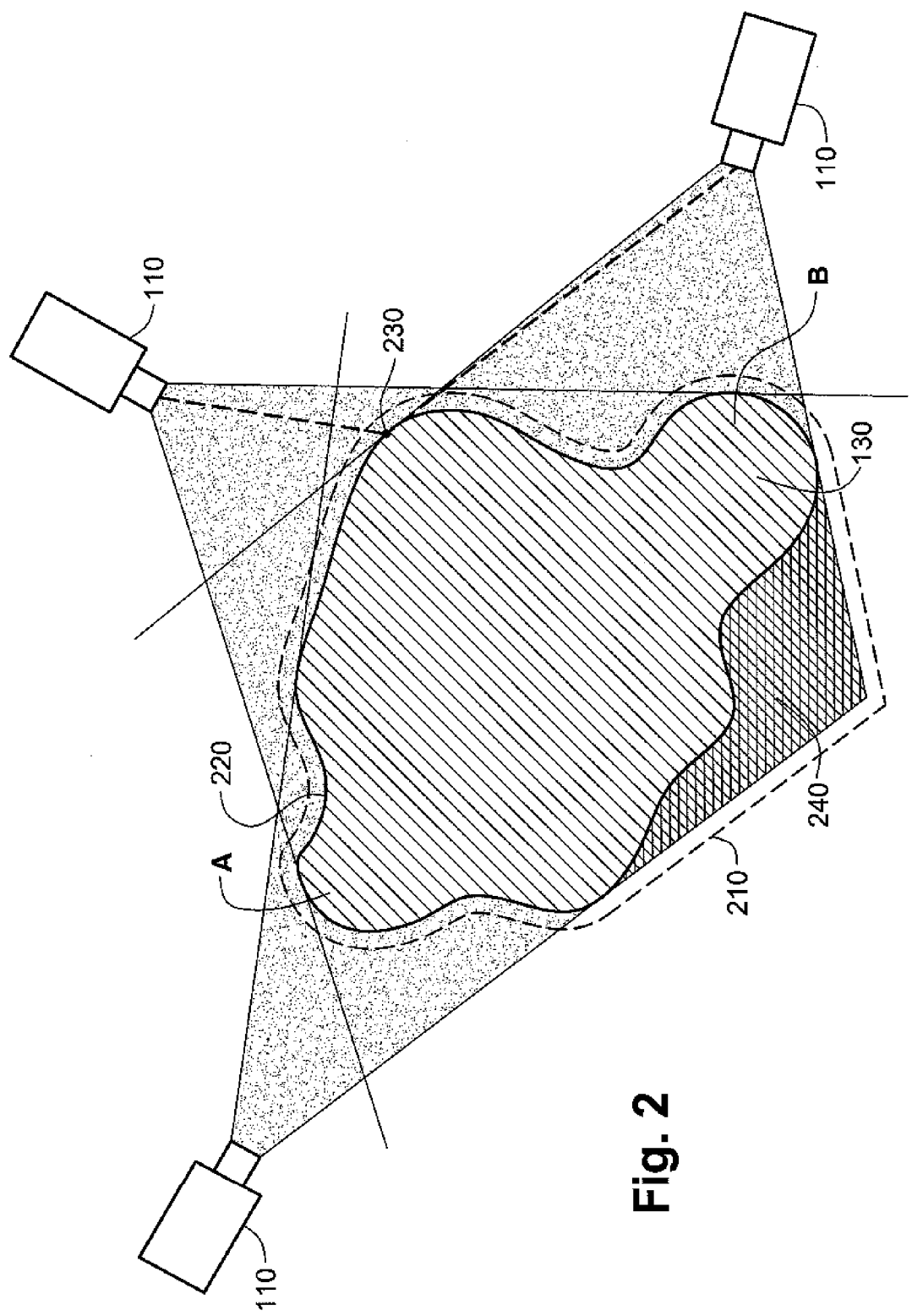
FIG. 2 is a schematic illustration of a depth hull formed by multiple depth cameras, according to an exemplary embodiment of the invention.

FIG. 2 is a schematic illustration of a depth hull 210 formed by multiple depth cameras (Z-cam 10), according to an exemplary embodiment of the invention. In an exemplary embodiment of the invention, Z-cams 110 provide depth details, which are used to construct a 3 dimensional geometric outline of subject 130. The 3 dimensional geometric outline of subject 130 is referred to in the art as depth hull 210. The construction of a depth hull 210 for a picture frame of the video recording will allow a viewer to adjust his/her viewpoint to any position around subject 130. Optionally, a general purpose computer is used to perform graphical calculations (e.g. rotating the depth hull) to enable a viewer to view the video from the viewpoint selected by the viewer. Alternatively or additionally, a dedicated micro chip, for example on a graphics card installed at the viewer's workstation may assist in creating and/or manipulating the depth hull.

In an exemplary embodiment of the invention, at least two Z-cams 110 are required to construct a reasonable depth hull 210 for the entire shape of 3 dimensional subject 130, for example by placing one on one side of subject 130 and one on the other side as shown in FIG. 1. Optionally, a reasonably accurate continuous segment 220 (AB), which allows a viewer to adjust his/her viewpoint continuously along the contour of segment 220 can be provided even by a single Z-cam 110 that views the entire segment. In any case, using multiple Z-cams 110 can increase the accuracy of depth hull 210 relative to the actual subject 130 since the position of a point 230 will be determined from two or more directions to prevent hidden areas. FIG. 2 illustrates the use of three Z-cams 110 to increase accuracy, although in the illustrated case the three Z-cams are positioned such that a blind area 240 occurs at the bottom of depth hull 210 and the accuracy of depth hull 210 relative to subject 130 is affected. Optionally, in creating depth hull 210 blind areas will be interpolated to provide a complete 3 dimensional geometric outline of subject 130 instead of just providing a segment 220. In some embodiments of the invention, the actual depth of blind areas may be resolved using information provided by the pictures from the various cameras recording subject 130, for example by analyzing outlines from standard pictures as known in the art.

In an exemplary embodiment of the invention, one or more V-cams 120 are positioned around subject 130 in addition to the Z-cams, to record the texture for the surface of depth hull 210. Optionally, the pictures acquired by the Z-cams and the V-cams are incorporated onto the surface of the 3 dimensional depth hull to provide an accurate picture for a specific viewpoint. In an exemplary embodiment of the invention, a viewer can view the video produced by one of the cameras (V-cam 120 or Z-cam 110). The viewer can request to shift his/her viewpoint left or right and continue to view a continuous video as the viewpoint rotates in the requested direction. In some embodiments of the invention the viewer can shift the viewpoint up and down if cameras are placed to support all directions.

Figure 3:
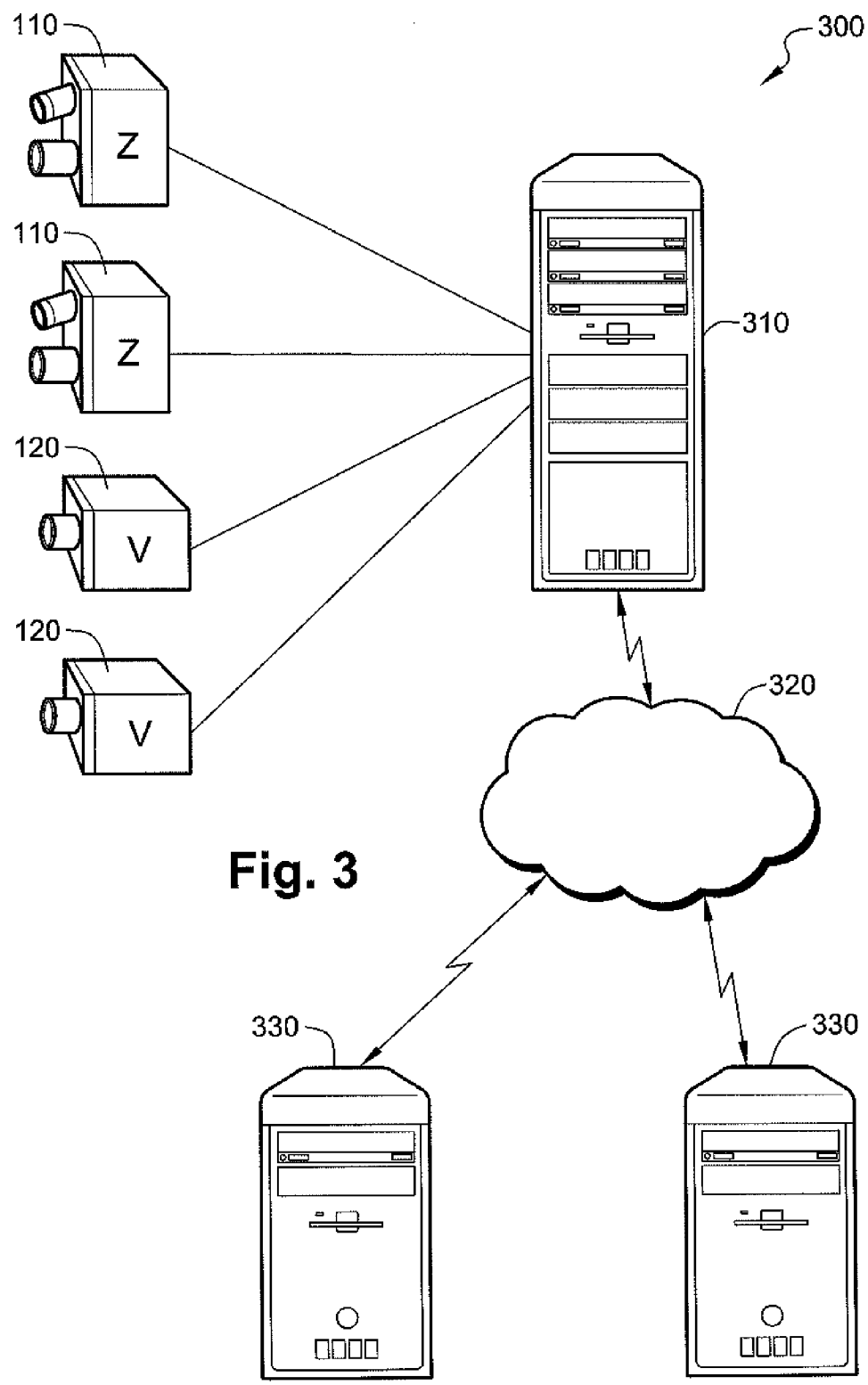
FIG. 3 is a schematic illustration of a system for distributing a recorded free viewpoint video, according to an exemplary embodiment of the invention.

FIG. 3 is a schematic illustration of a system 300 for distributing a recorded free viewpoint video, according to an exemplary embodiment of the invention. In an exemplary embodiment of the invention, V-cams 120 and Z-cams 110 are connected to a computer 310. The content recorded by the cameras (Z-cams 110, V-cams 120) is transmitted to computer 310. Computer 310 analyzes a single picture frame from each video camera provided simultaneously or between a specific time interval (e.g. if the video cameras are synchronized to record sequentially) to form depth hull 210 for each picture frame of the video recording. In some embodiments of the invention, computer 310 only uses the depth information to form depth hull 210. Alternatively, computer 310 enhances depth hull 210 using the pictures.

Optionally, viewers with local computers 330 are located at remote locations and connected to computer 310 via a network 320, for example over the Internet. In an exemplary embodiment of the invention, a viewer is provided with the calculated details of depth hull 210 for each video frame and with the video pictures of the cameras surrounding the viewpoint requested by the viewer, for example the video recording from the camera on the left of the viewpoint and the camera on the right of the viewpoint or any other camera that at least partially matches the required viewpoint. Optionally, local computer 330 then incorporates the pictures from one or more of the surrounding cameras as the texture onto depth hull 210 to provide a picture from the viewpoint requested by the viewer. This minimizes the burden on computer 310, since it performs only calculations that are common to all the remote viewers. Calculations that are specific to a single viewer are performed by the viewer. In some embodiments of the invention, for example when the computation ability of computer 310 is strong relative to the number of remote viewers, computer 310 can be used to perform the analysis of the information and provide local computer 330 with a video according to the selected viewpoint. Alternatively, rendering a depth hull 210 and incorporating the texture onto it may be performed by local computer 330 of the viewer interested in the specific viewpoint. Optionally, computer 310 transmits the relevant data to local computer 330, which then renders a full or partial depth hull and incorporates the texture onto it according to the required viewpoint.

In an exemplary embodiment of the invention, computer 310 synchronizes the cameras or provides a signal to the cameras to keep them in sync.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A method of remotely viewing a video from a selected viewpoint selected by the viewer from a continuous segment, comprising:
   receiving a recording of a video of a subject recorded using at least one depth video camera that records a video comprising a sequence of picture frames and additionally records a depth value for each pixel of the picture frames;
   receiving a recording of a video of the subject recorded using at least one standard video camera positioned to record a video at a viewpoint that differs from the viewpoint of the depth video camera; wherein said at least one depth video camera and said at least one standard video camera are operated synchronously;
   rendering a depth hull that defines a three dimensional outline of the subject being recorded using the depth values recorded by the depth video cameras;
   providing the recorded video from one or more cameras positioned on either side of the selected viewpoint;
   incorporating the recorded video from the one or more cameras onto the rendered depth hull to render a viewable video from the selected viewpoint; and displaying the rendered viewable video to the viewer.

2. A method according to claim 1, wherein said continuous segment encompasses 360 degrees around the subject.

3. A method according to claim 1, wherein said continuous segment encompasses less than 360 degrees around the subject.

4. A method according to claim 1, wherein said recording is performed using at least 2 depth video cameras.

5. A method according to claim 4, wherein said at least 2 depth video cameras are positioned on opposite sides of the subject.

6. A method according to claim 1, wherein said recording is performed using at least 2 depth video cameras and at least 2 standard video cameras surrounding the subject.

7. A method according to claim 1, wherein said rendering is performed by a server connected to the video cameras and provided to the remote viewer.

8. A method according to claim 1, wherein said rendering is performed by the remote viewer.

9. A method according to claim 1, wherein said providing comprises transmitting the information to the remote viewers.

10. A method according to claim 1, wherein said incorporating is performed by the renderer of the depth hull.

11. A method according to claim 1, wherein said 3 dimensional outline surrounds the entire shape of the subject.

12. A system for remotely viewing a video from a selected viewpoint selected by the viewer from a continuous segment, comprising:
    at least one depth video camera that records a video of a subject comprising a sequence of picture frames and additionally records a depth value for each pixel of the picture frames;
    at least one standard video camera positioned to record a video of the subject at a viewpoint that differs from the viewpoint of the depth video camera; wherein said at least one depth video camera and said at least one standard video camera are operated synchronously;
    a computer adapted to receive the recordings of all the video cameras and render a depth hull that defines a three dimensional outline of the subject being recorded using the depth values recorded by the depth video cameras;
    one or more remote viewer stations that are adapted to:
      1) select a viewpoint for viewing the recorded subject;
      2) receive the rendered depth hull;
      3) receive the recorded video from the recordings of one or more video cameras positioned on either side of the selected viewpoint of the viewer;
      4) incorporate the received recorded video onto the depth hull to render a viewable video from the selected viewpoint; and
      5) display the rendered viewable video to the viewer.

13. A system according to claim 12, comprising at least two depth video cameras.

14. A system according to claim 13, wherein said two depth video cameras are positioned on opposite sides of the recorded subject.

15. A system according to claim 12, comprising at least 2 depth video cameras and at least 2 standard video cameras surrounding the subject.

16. A system according to claim 12, wherein said computer is adapted to control the order of recording picture frames and depth values by the video cameras.

17. A system according to claim 12, wherein said continuous segment encompasses 360 degrees around the subject.

18. A system according to claim 12, wherein said continuous segment encompasses less than 360 degrees around the subject.

19. A system according to claim 12, wherein said 3 dimensional outline surrounds the entire shape of the subject.

20. A system for remotely viewing a video from a selected viewpoint selected by the viewer from a continuous segment, comprising:
    at least one depth video camera that records a video of a subject comprising a sequence of picture frames and additionally records a depth value for each pixel of the picture frames;
    at least one standard video camera positioned to record a video of the subject at a viewpoint that differs from the viewpoint of the depth video camera; wherein said at least one depth video camera and said at least one standard video camera are operated synchronously;

a computer adapted to receive the recordings of all the video cameras;

one or more remote viewer stations that are adapted to:
1) render a depth hull that defines a three dimensional outline of the subject being recorded using the depth values recorded by the depth video cameras;
2) select a viewpoint for viewing the recorded subject;
3) receive the recorded video from the recordings of one or more video cameras positioned on either side of the selected viewpoint of the viewer;
4) incorporate the received recorded video onto the depth hull to render a viewable video from the selected viewpoint; and
5) display the rendered viewable video to the viewer.

21. A system according to claim 20, wherein said 3 dimensional outline surrounds the entire shape of the subject.

22. A non-transitory computer readable medium comprising a set of computer executable instructions adapted to perform the following method:
receiving a recording of a video of a subject recorded using at least one depth video camera that records a video comprising a sequence of picture frames and additionally records a depth value for each pixel of the picture frames;
receiving a recording of a video of the subject recorded using at least one standard video camera positioned to record a video at a viewpoint that differs from the viewpoint of the depth video camera; wherein said at least one depth video camera and said at least one standard video camera are operated synchronously;
rendering a depth hull that defines a three dimensional outline of the subject being recorded using the depth values recorded by the depth video cameras;
providing the recorded video from one or more cameras positioned on either side of the selected viewpoint;
incorporating the recorded video from the one or more cameras onto the rendered depth hull to render a viewable video from the selected viewpoint; and displaying the rendered viewable video to the viewer.

* * * * *